(12) United States Patent
Snyder

(10) Patent No.: US 6,202,962 B1
(45) Date of Patent: Mar. 20, 2001

(54) FLEXIBLE STRAP FOR SUPPORTING HEATING AND COOLING DUCTS

(76) Inventor: Darryl L. Snyder, 4520 N. Market Ave., Canton, OH (US) 44714

( * ) Notice: Subject to any disclaimer, the term of this patent is extended or adjusted under 35 U.S.C. 154(b) by 0 days.

(21) Appl. No.: 09/197,549

(22) Filed: Nov. 23, 1998

(51) Int. Cl.[7] .................................................. F16L 3/137
(52) U.S. Cl. ............................ 248/60; 248/59; 24/16 PB
(58) Field of Search ................................ 248/59, 60, 73; 24/16 PB

(56) References Cited

U.S. PATENT DOCUMENTS

| | | | |
|---|---|---|---|
| 806,192 | * 12/1905 | Russell | 248/59 |
| 1,086,442 | * 2/1914 | Cornelius | 248/59 |
| 1,261,036 | * 4/1918 | Kerns | 248/59 X |
| 1,515,216 | * 11/1924 | Kissinger | 248/60 X |
| 2,707,607 | * 5/1955 | O'Connor | 248/60 |
| 3,224,054 | * 12/1965 | Lige | 24/16 PB |
| 3,979,094 | * 9/1976 | DeWitt | 248/60 |
| 6,073,315 | * 6/2000 | Rasmussen | 24/16 PB |

* cited by examiner

Primary Examiner—Ramon O. Ramirez
Assistant Examiner—Jon Szumny
(74) Attorney, Agent, or Firm—Sand & Sebolt

(57) ABSTRACT

This invention relates to a lengthy flexible strap of plastic material which can be used to support heating and cooling ducts in a building structure. The strap has a series of multiple spaced-apart apertures extending throughout its length to facilitate mounting and remounting of such ducts into desired final permanent arrangement. The grouped multiple apertures in the strap have both large and small adjacent locations with lines of severance therebetween for passage of large fastener heads through the larger apertures and prevention of such larger fastener heads through the smaller apertures. The strap may be easily relocated on the fasteners for realignment of the supported ducts.

10 Claims, 5 Drawing Sheets

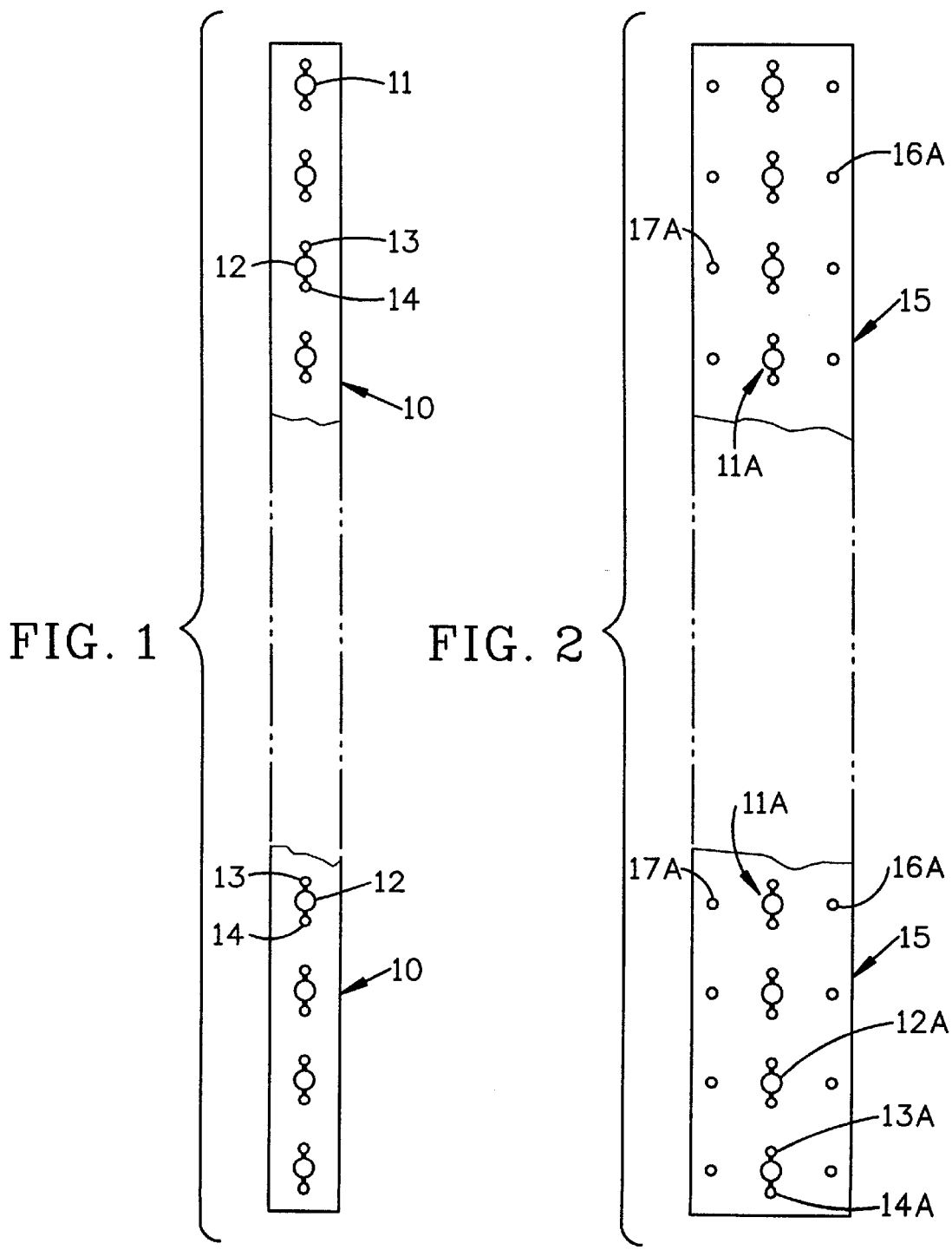

US 6,202,962 B1

FLEXIBLE STRAP FOR SUPPORTING HEATING AND COOLING DUCTS

BACKGROUND OF THE INVENTION

1. Field of the Invention

The present invention relates to a lengthy flexible strap for supporting heating and cooling ducts in a building structure.

2. Description of Related Art

In the past it has been conventional practice to mount heating and cooling ducts between floor and ceiling joists in fixed permanent relation. The ducts are commonly restrained by wires or metal straps which are connected to juxtaposed wooden joists or studs of a building structure. Nails or screws are driven into the joists in facing relationship at spaced-apart locations and the wires or metal straps are connected thereto after being wrapped around the ducts to permanently support the same. Frequently, the supporting wires or straps must be released and readjusted in their supporting relationships to realign the ducts, especially when lengthy runs of the ducts may be misaligned. Such relocation of the wires or metal straps is not easily achieved where the wires or straps must be removed from the supporting nails or screws. This may occur in more than one supporting location and often in multiple supporting spaced-apart locations, which is very time consuming and troublesome to properly complete a given construction job.

BRIEF SUMMARY OF THE INVENTION

An object of the present invention is to provide a unique flexible plastic strap having multiple spaced-apart apertures throughout its length to facititate expeditious mounting of heating and cooling ducts and to permit their ready readjustment as desired or required for a multitude of reasons. The novel strap of the present invention has both large and small inter-connected apertures formed closely-adjacent to each other in multiples to readily permit the passage of nail and screw heads through the large apertures and prevent the passage of nail and screw heads through the small apertures. Thus, the strap permits the readjustment of the duct locations using the previouslymounted nails and screws. The strap may be easily pulled away from the fixed nails and screws and realigned as necessary for the finished mounting of the ducts.

Another object of this invention is to provide a lengthy flexible plastic strap having repeditive multiples of sized apertures which strap may be used most expeditiously in a building construction project where heating and cooling ducts must be mounted in varied locations. The ducts may be finally located in their original positions as installed, or may be relocated to modified positions different from their original locations to facilitate the installation of other utilities, for example.

Another object of this invention is to provide a flexible plastic strap which has a series of identical plural apertures in uniform closely-spaced arrangement which facilitate the mounting of the strap to retain heating and cooling ducts in a building structure and which strap is capable of relocating or readjusting the duct location from its original position in an expeditious manner.

BRIEF DESCRIPTION OF THE SEVERAL VIEWS OF THE DRAWINGS

Further objects and advantages of the invention will be apparent upon reference to the following specification and claims as well as the appended drawings wherein:

FIG. 1 is a top plan view of the strap of the present invention.

FIG. 2 is a top plan view of another strap having a broader width with side openings near its edges.

DETAILED DESCRIPTION OF THE INVENTION

Figure 3:
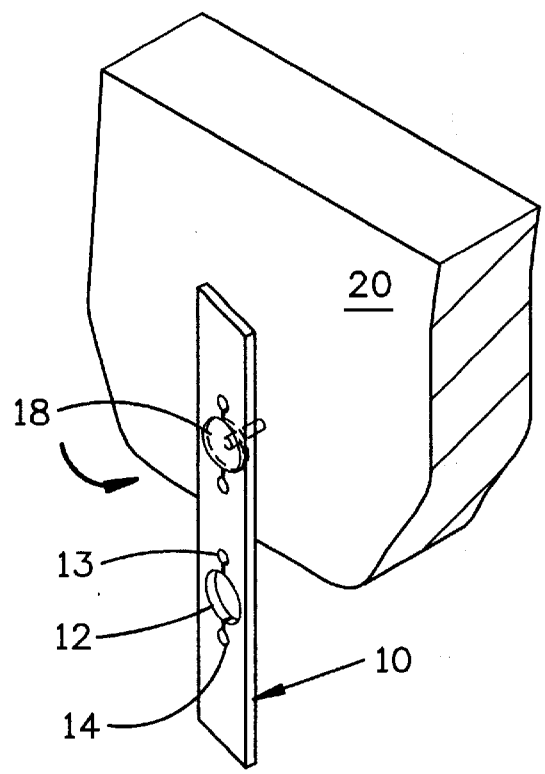
FIG. 3 is a perspective view of one end of the strap of FIG. 1 being attached to a wooden floor joist with a nail.

With reference to FIG. 1 of the drawings, the subject strap 10 is comprised of flexible plastic material such as high-density polyethylene or polypropylene having a width of about 1 inch and a thickness of about $\frac{1}{8}$ inch. The strap 10 has a repetitive series of grouped multiple apertures 11 extending throughout its length in uniform closely-spaced alignment. The grouped apertures are located on the center line of the strap. The repeated groups 11 of apertures are each comprised of one large aperture 12 and two smaller apertures 13 and 14 on each side of the larger, the smaller apertures being of the same size. The larger aperture 12 is circular in shape having a diameter ranging from about $\frac{1}{4}$ to $\frac{3}{8}$ inch. The smaller apertures have a similar uniform circular diameter ranging from about $\frac{1}{8}$ to $\frac{3}{16}$ inch. The smaller apertures 13 and 14 are located in lineal alignment with the larger aperture 12 and formed closely adjacent thereto.

The plural groups 11 of multiple apertures each have a line of severance connecting the single large aperture and the two smaller apertures. The said repeated groups 11 of apertures extend throughout the full length of the strap located on about 1 inch centers. The grouped apertures permit widely varying use of the strap for supporting all types of conventionally-formed shapes of heating and cooling ducts such as those having round, oval and rectangular cross-sectional shapes. Such shapes are all used in residential and commercial building construction and vary in size and shape depending on the building requirements.

The strap can be pulled downwardly after initial partial seating of the nail or screw to place the nail head and larger aperture in centered alignment for readjustment of the strap on the nail. The strap can then be removed from the nail and its position readjusted with the nail pulled upwardly or downwardly for final seating of the nail and strap with the duct in proper permanent alignment. The strap has the further advantage of being moved to its proper location with the nail shank surrounding the smaller aperture as desired. This is particularly important where the nail or screw cannot be removed or relocated due to space limitations around the duct once installed in temporary or permanent location.

FIG. 2 shows another modification of the strap designated by the numeral 15 having a wider width than the strap 10 and repeated groups 11a of multiple apertures as aforesaid. The strap 15 has a width varying from about 1 ½ to 2 inches. The strap edges have a series of spaced-apart parallel apertures or small holes 16a and 16b extending along both edges throughout the full length of the strap. The side apertures can be used to fasten the strap in place using nails or staples as desired or required.

The strap 15 has a series of grouped apertures 11a in a central lineal region similar to those apertures 11 shown and described in FIG. 1 with respect to strap 10. The repeated groups are preferably located on about 1 inch centers. Each group consists of one large aperture 12a and two smaller similar apertures 13a and 14a located on each side of the larger aperture in closelyspaced arrangement. The grouped apertures each have a lineal line os severance connecting each of the grouped apertures for passage of shank portions of nails or screws between the apertures.

Figure 4:
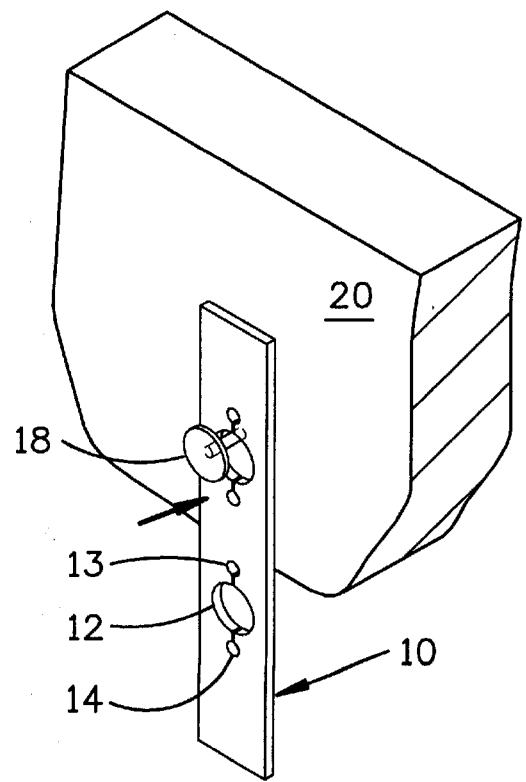
FIG. 4 is another perspective view of the strap end being attached to the wooden floor joist.
Figure 5:
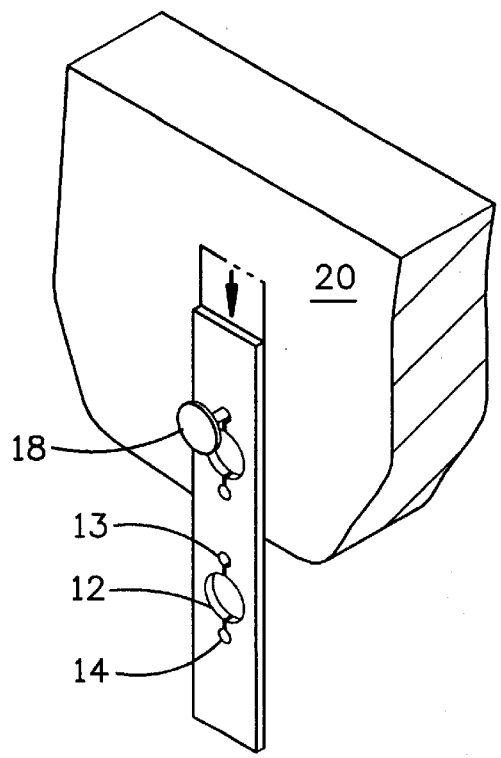
FIG. 5 is another perspective view of the strap end being adjusted downwardly for its attachment by the nail initially started in FIG. 4.
Figure 6:
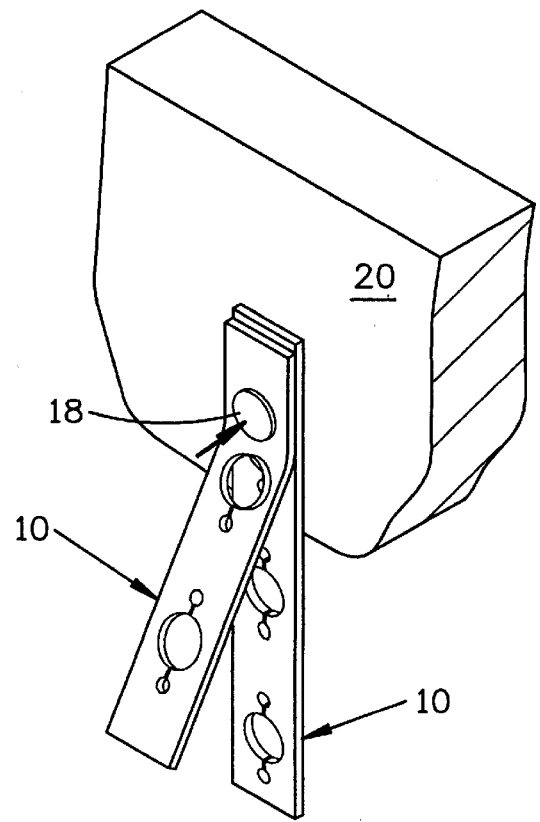
FIG. 6 is another perspective view of both ends of the being fully sea t and retained by a single nail engaging both ends of the strap.

FIGS. 3 and 4 both show how large-headed nails 18 may be driven through the strap apertures into wooden floor joists 20. The nails 18 may be only partially driven into the joists 20 to initially support the ducts, and then be finally seated in the joists after their alignment with the smaller apertures as shown in FIGS. 5 and 6. If the duct is found to be improperly supported by the strap, or not in correctly aligned relation with other portions of the duct, the strap end where connected to the nail or screw may be moved so that the head portion of the nail 18 is in alignment with the larger aperture 12. The strap can be easily pulled off the nail with the head portion 18a passing through the larger aperture 12. The strap end and the supported duct can then be realigned to place the nail and strap into proper seating relationship. Thus, the nail can be retained in place and the strap readjusted to place the duct into proper desired realignment. As aforesaid, the strap can be pulled downwardly to place the nail head in alignment with one of the small apertures for final seating of the nail or screw for permanent support of the duct. The strap has the advantage of its both temporary and permanent support of the duct without removal of the nail or screw which may or may not be easily achieved.

Figure 7:
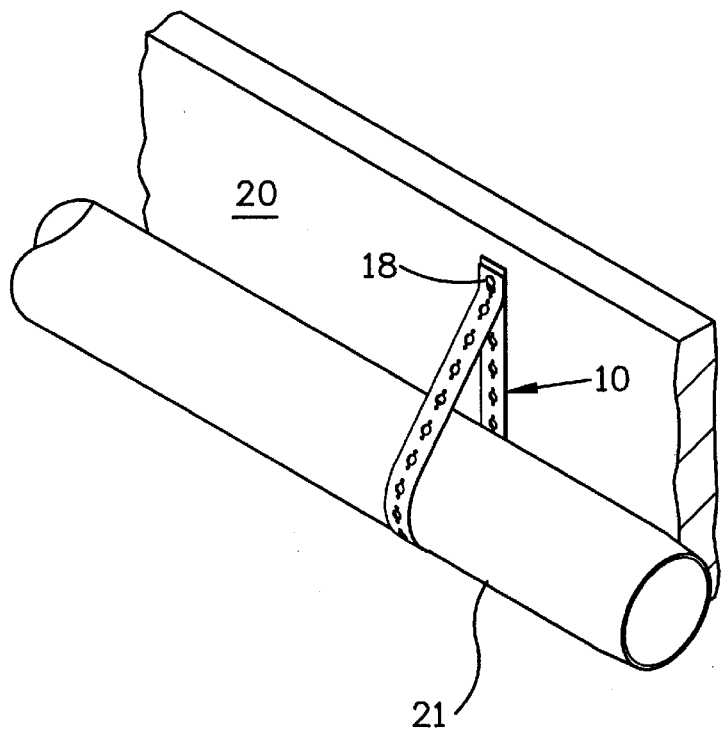
FIG. 7 is a perspective view of an air-flow duct retained by the strap ends using a single nail attached to a floor joist.
Figure 8:
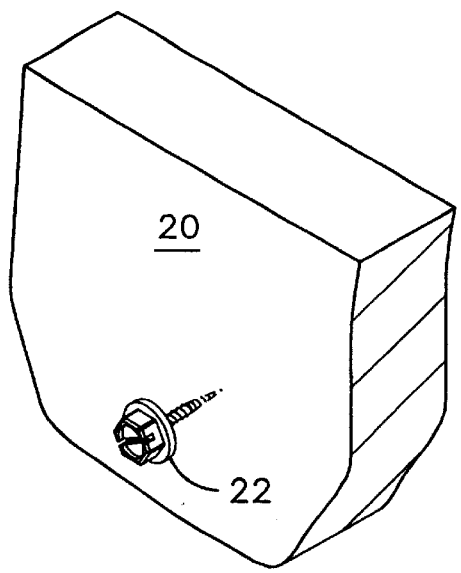
FIG. 8 is a perspective view of a metal screw attached to a floor joist for securing the strap end.
Figure 9:
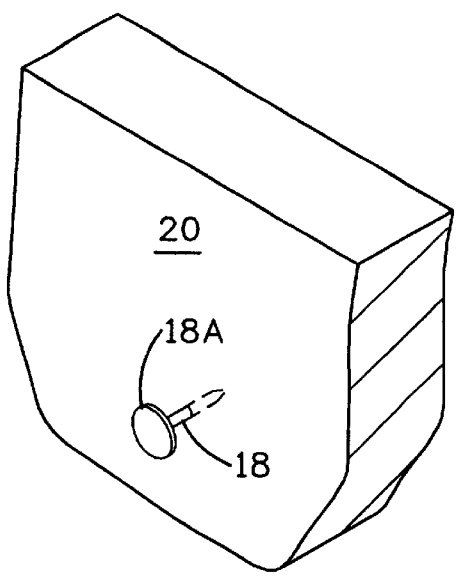
FIG. 9 is a perspective view similar to FIG. 8 of a nail having a large head for securing the strap end.
Figure 10:
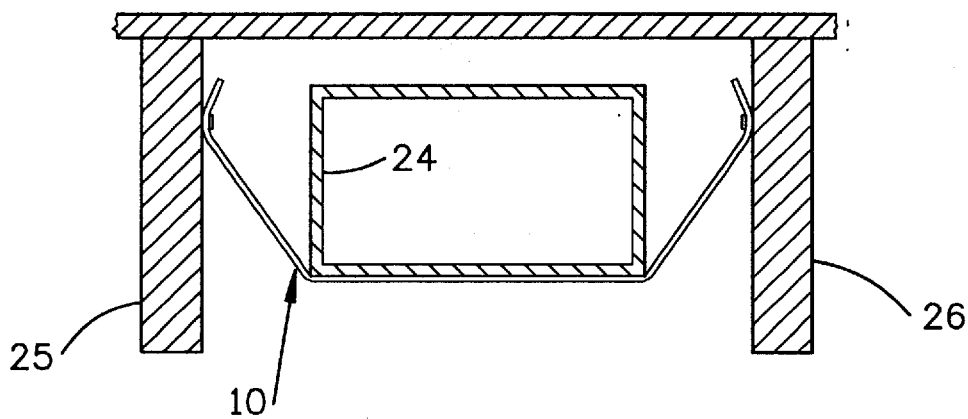
FIG. 10 is a vertical sectional view of the strap supporting a rectangular air-flow duct with the two strap ends secured to juxtaposed floor joists.
Figure 11:
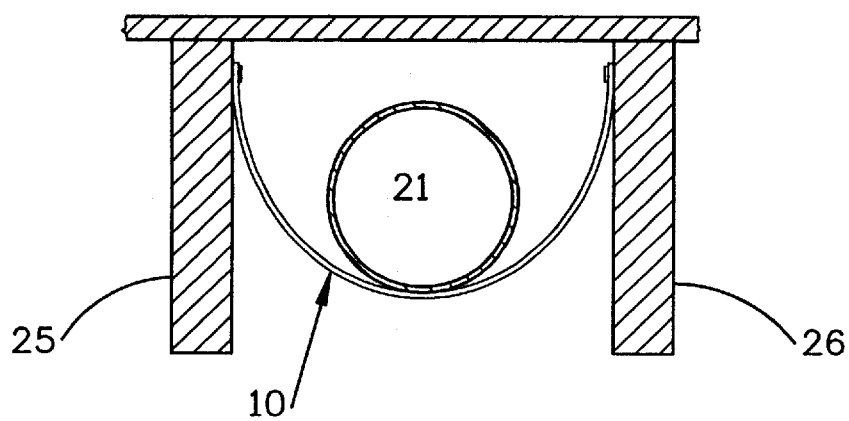
FIG. 11 is a view similar to FIG. 10 with the strap supporting porting a round duct suspended between floor joists.
Figure 12:
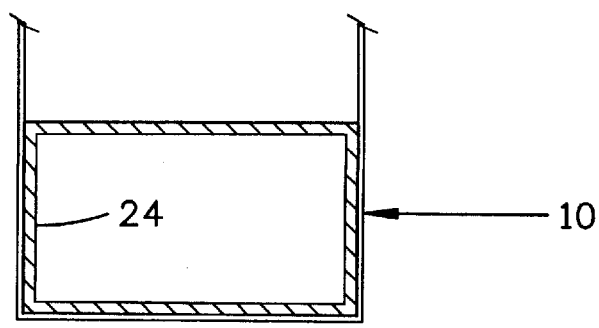
FIG. 12 s a fragmentary perspective view of the strap supporting a rectangular duct suspended from ceiling supports where a dropped ceiling is involved.

FIG. 7 shows a round duct 21 mounted on a single floor joist with both ends of the strap retained by a single nail 18 supporting a localized portion of the duct. FIGS. 8 and 9 show an individual single screw 22 and an individual single nail 18 respectively both having enlarged heads mounted in the floor joists 20 for receiving the apertured strap. FIG. 10 shows a rectangular hollow air duct 24 supported by the strap connected to juxtaposed floor joists 25 and 26 by nails driven into their facing surfaces. FIG. 11 shows a round duct suspended between adjacent floor joists, FIG. 12 shows a rectangular duct suspended from ceiling supports by the strap where a dropped ceiling is involved.

As described hereinabove, the strap being readily flexible and having the grouped sized apertures 12, 13 and 14 permit ready realignment of the strap and duct into proper final relationship with a minimum amount of effort. The enlarged heads of the attachment fasteners may be easily moved into alignment with the larger apertures of the strap and the strap pulled away therefrom. The strap can be relocated and realigned with the fastener head, and then be moved into alignment with one of the smaller apertures of the strap for final seating of the strap in the floor joist or wherever else mounted. Such readjustment is easily accomplished without removal of the fastener element.

Thus, the present invention provides a novel supporting strap for forced-air ducts in a building structure which strap facilitates temporary mounting and realigned final mounting of such ducts as desired or required.

In the foregoing description, certain terms have been used for brevity, clearness and understanding; but no unnecessary limitations are to be implied therefrom beyond the requirement of the prior art, because such terms are used for descriptive purposes and are intended to be broadly construded.

Moreover, the description and illustration of the invention are by way of example, and the scope of the invention is not limited to the exact details shown or described.

Various modifications may be resorted to within the spirit and scope of the appended claims.

I claim:

1. A support device for securing heating and cooling ducts between floor and ceiling joists that is adapted to be secured to a vertical surface, said support device comprising:

a substantially flat, planar strap having a length, a width, and a thickness; the length being substantially longer than the width; the width being substantially greater than the thickness;

the device having a plurality of sets of circular apertures; each said set being formed of at least two apertures; a first aperture of each of said sets having a diameter larger than the diameter of a second of said at least two apertures; each first aperture and second aperture of each set having a line of severance connecting the outer circumference of the first aperture to the second aperture; the line of severance having adjacent, abutting side edges; the centers of all of the apertures of all the sets being located on a common axis;

whereby the strap is adapted to be repositioned over a headed fastener located in a joist by positioning the first aperture of one of said sets over a head of the headed fastener and then said strap pulled down so that a shank of said fastener is adapted to pass through the line of severance until the shank of said fastener is positioned in the second aperture and wherein the second aperture is adapted to be smaller than the head of the fastener to prevent removal of said strap from said fastener;

and whereby the strap may be pulled in a upward direction to position the shank of the fastener in the first aperture to be able to remove said strap from said fastener without removing said fastener from said joist.

2. The support device of claim 1, wherein the strap is fabricated from a flexible polyethylene material.

3. The support device of claim 1, wherein the width of the body is about one inch.

4. The support device of claim 1, wherein the width of the body is about one and one-half inches.

5. The support device of claim 1, wherein the body includes a pair of edges disposed along the length of the body.

6. The support device of claim 5, wherein the body defines holes adjacent the edges.

7. The support device of claim 1, wherein the first diameter is about twice as large as the second diameter.

8. The support device of claim 1, wherein the body defines a third aperture; the first aperture being disposed between the second and third apertures.

9. The support device of claim 8, wherein a line of severance connects the third aperture to the first aperture.

10. The support device of claim 8, wherein the third aperture has a diameter smaller than the diameter of the first aperture.

* * * * *